(No Model.)
B. WOODWARD.
VARYING SPEED GEAR FOR VELOCIPEDES.
No. 568,394. Patented Sept. 29, 1896.
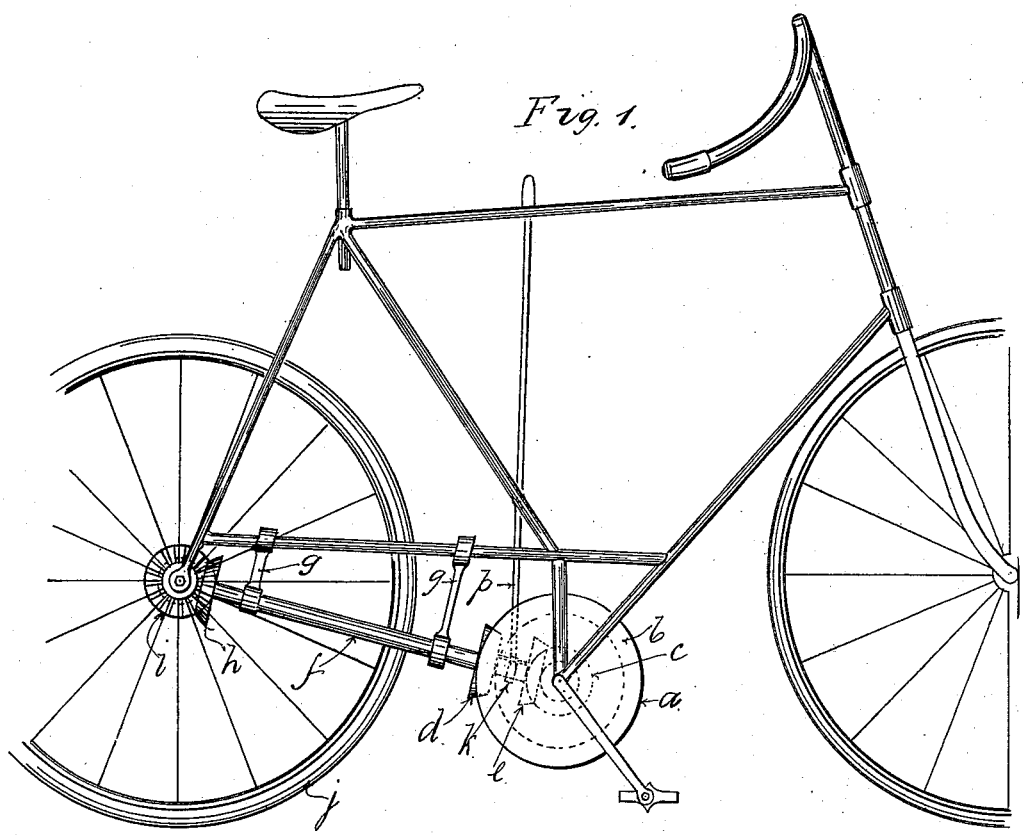
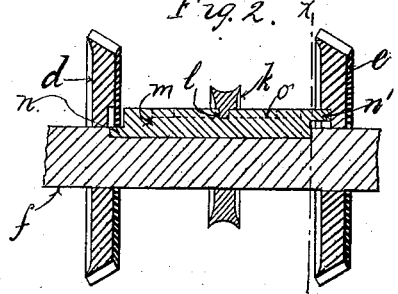
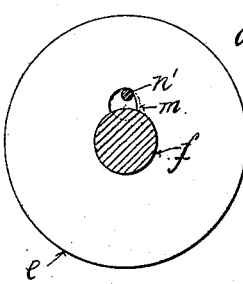
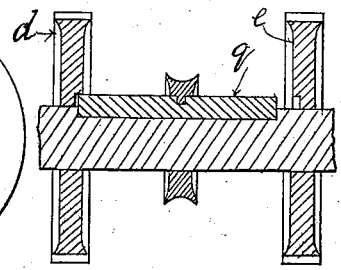
Witnesses.
Benjamin Clark.
James Fleming.
Inventor.
Beaumoris Woodward
per E. Eaton
His Attorney.

UNITED STATES PATENT OFFICE.

BEAUMORIS WOODWARD, OF CHISELHURST, ENGLAND.

VARYING-SPEED GEAR FOR VELOCIPEDES.

SPECIFICATION forming part of Letters Patent No. 568,394, dated September 29, 1896.

Application filed July 26, 1895. Serial No. 557,232. (No model.)

*To all whom it may concern:*

Be it known that I, BEAUMORIS WOODWARD, a subject of the Queen of Great Britain, and a resident of Chiselhurst, in the county of Kent, England, have invented certain new and useful Improvements in Varying-Speed Gear for Velocipedes, of which the following is a full, clear, and exact specification.

This invention relates to improvements in varying-speed gear for velocipedes, the object being to provide a ready means of varying the relative speeds of the pedals and the driving-wheel, at the same time dispensing with the ordinary driving chain or chains, and the same is carried out as follows:

For purposes of illustration of my invention I will now refer to the annexed drawings, in which—

Figure 1 is a side elevation of my invention applied to a bicycle. Fig. 2 is a sectional view, to enlarged scale, showing one of the forms of clutches which I find suitable and convenient to employ; Fig. 3, a cross-section through line $x\ y$; Fig. 4, a plan view of bolt in Fig. 2.

Referring to Fig. 1, $a$ is a wheel having two or more sets or circles of teeth $b$ and $c$ upon same.

$d$ and $e$ are toothed wheels, which gear with the teeth $b$ and $c$, respectively. The toothed wheels $d$ and $e$ are carried upon a rod or shaft $f$, having suitable bearings, such as at $g$, upon the frame of the machine. This rod or shaft $f$ carries the toothed wheel $h$, which gears with the toothed wheel $i$, fixed upon the axle of the driving-wheel or attached to the driving-wheel itself $j$. The sliding collar or clutch $k$ has a pin or projection $l$, which engages in a spiral groove $o$, running round the bolt $m$, being located between the bevel-wheels $d$ and $e$ upon the rod or shaft $f$, terminating in openings or slots parallel with the longitudinal axis of bolt, this bolt having studs or projections $n\ n'$. By moving the collar $k$ in a lateral direction the bolt $m$, which lies in a recess in the rod $f$, is caused to make a partial revolution and one of the studs $n$ or $n'$ will engage with one of the wheels $d$ or $e$, according to the direction of motion, thus driving the rod $f$. The sliding collar $k$ may be operated in any convenient way, such as by the forked lever $p$, operated by the rider. By this arrangement it will be seen that when the one wheel, $e$, is driving the rod $f$ the other wheel, $d$, is inoperative or running free on the rod $f$.

It will be readily seen that any of the well-known arrangements of clutches may be employed to render the wheels operative or inoperative upon the rod $f$. By the use of the rod $f$ and wheels $d$ and $e$ for varying the speed the usual chain is dispensed with altogether, and, if desired, a similar arrangement of wheels and clutch can be employed in place of the fixed wheel $h$.

Having thus described my invention, what I claim, and desire to secure by Letters Patent, is—

In varying-speed gear of the class herein described in combination therewith a clutch consisting of a sliding collar having a pin or projection a bolt having a spiral groove or slot in which said pin or projection engages; a slot or recess in the driving-rod in which said bolt is carried; a pin or projection on each end of said bolt at opposite edges of same which engages with the toothed wheels $d$ and $e$ according to the direction in which the collar is moved; a lever having a fork for operating said clutch or collar, substantially as described and illustrated herein.

In testimony that I claim the foregoing I have hereunto set my hand this 13th day of July, 1895.

B. WOODWARD.

Witnesses:
JAMES FLEMING,
WILLIAM JOHN WEEKS.